United States Patent
Zhu (10) Patent No.: US 10,789,672 B2
(45) Date of Patent: Sep. 29, 2020

(54) METHOD AND DEVICE FOR PERFORMING MAPPING ON SPHERICAL PANORAMIC IMAGE

(71) Applicant: BEIJING QIYI CENTURY SCIENCE & TECHNOLOGY CO., LTD., Beijing (CN)

(72) Inventor: Jiadan Zhu, Beijing (CN)

(73) Assignee: BEIJING QIYI CENTURY SCIENCE & TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 16/312,564

(22) PCT Filed: Aug. 15, 2017

(86) PCT No.: PCT/CN2017/097489
§ 371 (c)(1),
(2) Date: Dec. 21, 2018

(87) PCT Pub. No.: WO2018/059146
PCT Pub. Date: Apr. 5, 2018

(65) Prior Publication Data
US 2019/0311459 A1 Oct. 10, 2019

(30) Foreign Application Priority Data
Sep. 29, 2016 (CN) .......................... 2016 1 0868060

(51) Int. Cl.
*G06T 3/00* (2006.01)
*G06T 3/60* (2006.01)
*G06T 11/60* (2006.01)

(52) U.S. Cl.
CPC ............ *G06T 3/0068* (2013.01); *G06T 3/005* (2013.01); *G06T 3/0062* (2013.01); *G06T 3/60* (2013.01); *G06T 11/60* (2013.01); *G06T 2200/24* (2013.01)

(58) Field of Classification Search
CPC .... G09G 5/14; G09G 2340/125; G09G 5/395; G09G 2340/10; G06F 3/14; G06T 3/0068; G06T 3/0062; G06T 3/60
See application file for complete search history.

(56) References Cited

U.S. PATENT DOCUMENTS

| | | | | |
|---|---|---|---|---|
| 9,330,501 B2 * | 5/2016 | Sahoo | ................... | G06T 19/006 |
| 2010/0103175 A1 * | 4/2010 | Okutomi | ............... | G06T 3/4053 |
| | | | | 345/428 |

(Continued)

FOREIGN PATENT DOCUMENTS

| CN | 102915526 | 2/2013 |
|---|---|---|
| CN | 103017653 | 4/2013 |

(Continued)

OTHER PUBLICATIONS

Li, X. et al. "Spherical panorama creating algorithm based on curve surface mosaic", Journal of Beijing University of Aeronautics and Astronautics, vol. 33, No. 6, dated Jun. 2007.

(Continued)

*Primary Examiner* — Todd Buttram
(74) *Attorney, Agent, or Firm* — Alston & Bird LLP (57) ABSTRACT

Disclosed are a method and device for image pasting on a spherical panoramic image. The method may comprise: establishing a spherical coordinate system for a first spherical panoramic image; mapping the first spherical panoramic image on a spherical surface to obtain a spherical projection image of the first spherical panoramic image; determining a first image pasting area in the spherical projection image according to the selection of the user and transforming the (Continued)

corresponding image into a plane image; transforming the image to be pasted into a shape of the plane image; mapping the transformed image to be pasted to the spherical coordinate system; rotating the image to be pasted that is mapped to the spherical coordinate system to a position at which the first image pasting area overlaps with the image; transforming the image to be pasted after being transformed into a second spherical panoramic image; determining a second image pasting area corresponding to the first image pasting area; and interpolating the second spherical panoramic image into the second image pasting area to complete the pasting. Distortionless image pasting on a spherical panoramic image may be realized.

8 Claims, 4 Drawing Sheets

(56) References Cited

U.S. PATENT DOCUMENTS

| | | | | |
|---|---|---|---|---|
| 2010/0250120 | A1* | 9/2010 | Waupotitsch | G06T 3/4038 |
| | | | | 701/408 |
| 2013/0314402 | A1* | 11/2013 | Furumura | G03B 35/02 |
| | | | | 345/419 |
| 2016/0073022 | A1* | 3/2016 | Kimura | G06T 3/0012 |
| | | | | 348/36 |
| 2016/0241836 | A1* | 8/2016 | Cole | H04N 19/597 |

FOREIGN PATENT DOCUMENTS

| | | |
|---|---|---|
| CN | 103092612 | 5/2013 |
| CN | 104183006 | 12/2014 |
| CN | 105205853 | 12/2015 |
| CN | 105654538 | 6/2016 |
| CN | 105872386 | 8/2016 |
| CN | 105957008 | 9/2016 |
| CN | 106548446 | 3/2017 |
| JP | 2007233996 A | 9/2007 |
| JP | 2007318754 A * | 12/2007 |
| JP | 2010014710 A | 1/2010 |
| JP | 2012080433 A | 4/2012 |
| JP | 2012256274 A | 12/2012 |
| JP | 2013143725 A | 7/2013 |
| JP | 2016062486 A | 4/2016 |
| KR | 10-2009-0012290 A | 2/2009 |
| TW | M396430 | 1/2011 |
| TW | 1528328 | 4/2016 |
| TW | 1549478 | 9/2016 |
| WO | WO 1995/25399 A1 | 9/1995 |

OTHER PUBLICATIONS

Office Action for Chinese Application No. 201610868060.4 dated Jan. 2, 2019.

Office Action for Taiwanese Application No. 106133168 dated Feb. 12, 2018.

International Search Report and Written Opinion for International Application No. PCT/CN2017/097489 dated Nov. 20, 2017, 7 pages.

Anonymous: "Technique: Fast and Easy Way to Add Logo to 360 Photos and Videos—360 Rumors", [online] [retrieved Oct. 11, 2019], retrieved from the Internet, URL:<http://360rumors.com/technique-fast-and-easy-way-to-add-logo/> dated (Jul. 13, 2016), pp. 1-4.

Anonymous: "Technique: How to rotate a 360 photo or a 360 logo or watermark—360 Rumors", [online] [retrieved Oct. 11, 2019], URL:<http://360rumors.com/technique-how-to-rotate-360-photo-or/>, dated (Aug. 11, 2016), pp. 1-4.

Gabriele, F. et al. "Photogrammetric Processing of Spherical Panoramas", Photogrammetic Record., vol. 28, No. 143, (Sep. 1, 2013), pp. 293-311.

Zakharchenko. V. et. al.: "Quality metric for spherical panoramic video", Proceedings of SPIE; [Proceedings of SPIE ISSN 0277-786X vol. 10524], SPIE, US, vol. 9970, dated (Sep. 14, 2016), pp. 99700C-99700C.

Extended European Search Report for European Application No. 17854598.4 dated Aug. 26, 2019.

Office Action for Korean Application No. 10-2019-7003875 dated Feb. 20, 2020.

Office Action for Japanese Application No. 2019-533267 dated May 12, 2020.

* cited by examiner

METHOD AND DEVICE FOR PERFORMING MAPPING ON SPHERICAL PANORAMIC IMAGE

CROSS-REFERENCE TO RELATED APPLICATIONS

The present application is a national phase entry of International Application No. PCT/CN2017/097489, filed Aug. 15, 2017, which claims priority to Chinese patent application No. 201610868060.4, filed before the State Intellectual Property Office of PRC on Sep. 29, 2016 and entitled "METHOD AND DEVICE FOR PERFORMING MAPPING ON SPHERICAL PANORAMIC IMAGE", the entire contents both of which are incorporated herein by reference in their entireties.

TECHNICAL FIELD

The present application relates to the field of panoramic image processing, and in particular to a method and device for image pasting on a spherical panorama image.

BACKGROUND

With the progress of the society, people have a need to paste images on given locations of some pictures or on a certain plane that is displayed on a picture.

The existing image pasting technique maps images on 2D images (plane images) that conform to the monocular imaging principle.

With the development of the panoramic image collector and the panorama image splicing technology, now panoramic images could be obtained easily, particularly spherical panoramic images that cover 360 degrees in horizontal direction and cover 90 degrees in vertical direction are widely used in the field of virtual reality. However, a spherical panoramic image is no longer consistent with the monocular imaging principle, so image pasting on the spherical panorama image with the prior art will cause image distortion.

Therefore, the implementation of distortionless image pasting on the spherical panoramic image is an urgent problem to be solved.

SUMMARY

The object of embodiments of the present application is to provide a method and device for image pasting on a spherical panoramic image to achieve distortionless image pasting on a spherical panoramic image.

In order to achieve the above object, an embodiment of the present application discloses a method for image pasting on a spherical panoramic image, the method comprises:

establishing a spherical coordinate system for a first spherical panoramic image;

mapping the first spherical panoramic image on a spherical surface corresponding to the spherical coordinate system to obtain a spherical projection image of the first spherical panoramic image;

determining a first image pasting area of an image to be pasted in the spherical projection image according to a selection operation by a user for the spherical projection image;

transforming the image corresponding to the first image pasting area into a plane image;

transforming a shape of the image to be pasted into a shape of the plane image;

mapping the shape-transformed image to be pasted into the spherical coordinate system;

rotating the image to be pasted that is mapped into the spherical coordinate system to a position at which the first image pasting area overlaps with the image;

transforming the image to be pasted that is rotated to the position at which the first image pasting area overlaps with the image into a second spherical panoramic image;

determining a second image pasting area corresponding to the first image pasting area in the first spherical panoramic image; and interpolating the second spherical panoramic image into the second image pasting area to complete the pasting of the image to be pasted on the first spherical panoramic image.

Preferably, the transforming the image corresponding to the first image pasting area into a plane image may comprise:

determining central point coordinates of the first image pasting area;

rotating the spherical projection image according to the central point coordinates, wherein the central point coordinates in the rotated spherical projection image are (0, 0) in a case that the coordinates are represented by longitude and latitude;

transforming the image corresponding to the first image pasting area in the rotated spherical projection image into the plane image according to the following formula:

$$(\lambda', \phi') \to (u, v) = r\left(\tan(\lambda'), \frac{\tan(\phi')}{\cos(\lambda')}\right),$$

wherein, $(\lambda', \phi')$ are coordinates in the spherical coordinate system of a point in the image corresponding to the first image pasting area in the rotated spherical projection image; $\lambda', \phi'$ are respectively a latitude and a longitude of a point in the image corresponding to the first image pasting area in the rotated spherical projection image; $(u,v)$ are corresponding coordinates in plane-rectangular coordinate system of the point with coordinates of $(\lambda', \phi')$;

$$r = \frac{n}{2\pi},$$

r is radius of the spherical projection image, and n is width of the first spherical panoramic image.

Preferably, the transforming a shape of the image to be pasted into a shape of the plane image may comprise:

determining a homography matrix according to the plane image and the image to be pasted; and performing a plane perspective transformation on the image to be pasted according to the homography matrix to transform the shape of the image to be pasted into the shape of the plane image.

Preferably, the mapping the shape-transformed image to be pasted into the spherical coordinate system may comprise:

mapping the shape-transformed image to be pasted into the spherical coordinate system according to the following formula:

$$(u, v) \to (\lambda, \phi) = \left( \arctan\left(\frac{u}{r}\right), \arccos\left(v * \frac{\cos\left(\arctan\left(\frac{u}{r}\right)\right)}{r}\right)\right),$$

wherein, (u,v) are coordinates in the plane coordinate system of a point in the shape-transformed image to be pasted; (λ,ϕ) are coordinates of the point with coordinates of (u,v) that are mapped into the spherical coordinate system;

$$r = \frac{n}{2\pi},$$

r is radius of the spherical projection image, and n is width of the first spherical panoramic image.

Preferably, the transforming the image to be pasted that is rotated to the position, at which the first image pasting area overlaps with the image, into a second spherical panoramic image may comprise:

transforming the image to be pasted that is rotated to the position, at which the first image pasting area overlaps with the image, into the second spherical panoramic image according to the following formula:

$$(\lambda', \phi') \to (x, y) = \left((m-1) - \left(\frac{\phi' + \frac{\pi}{2}}{\pi}\right)(m-1), \left(\frac{\lambda' + \phi'}{2\pi}\right)(n-1)\right),$$

wherein, (λ',ϕ') are coordinates in the spherical coordinate system of a point in the image to be pasted that is rotated to the position, at which the first image pasting area overlaps with the image; λ',ϕ' are respectively a longitude and a latitude of a point in the image to be pasted that is rotated to the position, at which the first image pasting area overlaps with the image; (x,y) are coordinates of a point with coordinates of (λ',ϕ') that are mapped into the plane coordinate system; m and n are respectively height and width of the first spherical panoramic image.

In order to achieve the above object, the embodiments of the present application also provide a device for image pasting on a spherical panoramic image. The device may comprise: a establishing module, a first mapping module, a first determining module, a first transforming module, a second transforming module, a second mapping module, a rotating module, a third transforming module, a second determining module, and an interpolating module, wherein, the establishing module is used for establishing a spherical coordinate system for a first spherical panoramic image;

the first mapping module is used for mapping the first spherical panoramic image on a spherical surface corresponding to the spherical coordinate system to obtain a spherical projection image of the first spherical panoramic image;

the first determining module is used for determining a first image pasting area of an image to be pasted in the spherical projection image according to a selection operation by a user for the spherical projection image;

the first transforming module is used for transforming the image corresponding to the first image pasting area into a plane image;

the second transforming module is used for transforming a shape of the image to be pasted into a shape of the plane image;

the second mapping module is used for mapping the shape-transformed image to be pasted into the spherical coordinate system;

the rotating module is used for rotating the image to be pasted that is mapped into the spherical coordinate system to a position at which the first image pasting area overlaps with the image;

the third transforming module is used for transforming the image to be pasted that is rotated to the position at which the first image pasting area overlaps with the image into a second spherical panoramic image;

the second determining module is used for determining a second image pasting area corresponding to the first image pasting area in the first spherical panoramic image; and the interpolating module is used for interpolating the second spherical panoramic image into the second image pasting area to complete the pasting of the image to be pasted on the first spherical panoramic image.

Preferably, the first transforming module may be specifically used for:

determining central point coordinates of the first image pasting area;

rotating the spherical projection image according to the central point coordinates, wherein the central point coordinates in the rotated spherical projection image are (0, 0) in a case that the coordinates are represented by longitude and latitude;

transforming the image corresponding to the first image pasting area in the rotated spherical projection image into the plane image according to the following formula:

$$(\lambda', \phi') \to (u, v) = r\left(\tan(\lambda'), \frac{\tan(\phi')}{\cos(\lambda')}\right),$$

wherein, (λ',ϕ') are coordinates in the spherical coordinate system of a point in the image corresponding to the first image pasting area in the rotated spherical projection image; λ',ϕ' are respectively a latitude and a longitude of a point in the image corresponding to the first image pasting area in the rotated spherical projection image; (u,v) are corresponding coordinates in plane-rectangular coordinate system of the point with coordinates of (λ',ϕ');

$$r = \frac{n}{2\pi},$$

r is radius of the spherical projection image, and n is width of the first spherical panoramic image.

Preferably, the second transforming module may be specifically used for:

determining a homography matrix according to the plane image and the image to be pasted; and performing a plane perspective transformation on the image to be pasted according to the homography matrix to transform the shape of the image to be pasted into the shape of the plane image.

Preferably, the second mapping module may be specifically used for:

mapping the shape-transformed image to be pasted into the spherical coordinate system according to the following formula:

$$(u, v) \to (\lambda, \phi) = \left( \arctan\left(\frac{u}{r}\right), \arccos\left( v * \frac{\cos\left(\arctan\left(\frac{u}{r}\right)\right)}{r} \right) \right),$$

wherein, (u,v) are coordinates in the plane coordinate system of a point in the shape-transformed image to be pasted; (λ,φ) are coordinates of the point with coordinates of (u,v) that are mapped into the spherical coordinate system;

$$r = \frac{n}{2\pi},$$

r is radius of the spherical projection image, and n is width of the first spherical panoramic image.

Preferably, the third transforming module may be specifically used for:

transforming the image to be pasted that is rotated to the position, at which the first image pasting area overlaps with the image, into the second spherical panoramic image according to the following formula:

$$(\lambda', \phi') \to (x, y) = \left( (m-1) - \left( \frac{\phi' + \frac{\pi}{2}}{\pi} \right)(m-1), \left( \frac{\lambda' + \phi'}{2\pi} \right)(n-1) \right),$$

wherein, (λ',φ') are coordinates in the spherical coordinate system of a point in the image to be pasted that is rotated to the position, at which the first image pasting area overlaps with the image; λ',φ' are respectively a longitude and a latitude of a point in the image to be pasted that is rotated to the position, at which the first image pasting area overlaps with the image; (x,y) are coordinates of a point with coordinates of (λ',φ') that are mapped into the plane coordinate system; m and n are respectively height and width of the first spherical panoramic image.

In order to achieve the above object, the embodiments of the present application also disclose an electronic device. The electronic device may include a processor, a communication interface, a memory, and a communication bus, wherein the processor, the communication interface, and the memory are communicated with each other via the communication bus;

the memory is used for storing computer programs; and the processor is used for implementing the method according to any one of claims 1 to 5 by executing the program stored on the memory.

In order to achieve the above object, the embodiments of the present application also disclose a computer readable storage medium. The computer readable storage medium stores a computer program thereon, and when being executed by a processor, the computer program is able to implement any one of above methods for image pasting on a spherical panorama image.

In order to achieve the above object, the embodiments of the present application also disclose a computer program. The computer program is able to implement any one of the above methods for image pasting on a spherical panoramic image when being executed.

The present applications provide a method for image pasting on a spherical panoramic image, and the method comprises: establishing a spherical coordinate system for a first spherical panoramic image; mapping the first spherical panoramic image on a spherical surface corresponding to the spherical coordinate system to obtain a spherical projection image of the first spherical panoramic image; determining a first image pasting area of an image to be pasted in the spherical projection image according to a selection operation by a user for the spherical projection image; transforming the image corresponding to the first image pasting area into a plane image; transforming a shape of the image to be pasted into a shape of the plane image; mapping the shape-transformed image to be pasted into the spherical coordinate system; rotating the image to be pasted that is mapped into the spherical coordinate system to a position at which the first image pasting area overlaps with the image; transforming the image to be pasted that is rotated to the position at which the first image pasting area overlaps with the image into a second spherical panoramic image; determining a second image pasting area corresponding to the first image pasting area in the first spherical panoramic image; and interpolating the second spherical panoramic image into the second image pasting area to complete the pasting of the image to be pasted on the first spherical panoramic image.

In the embodiments of the present application, the image corresponding to the first image pasting area is transformed into a plane image, which is a plane image conforming to the monocular perspective imaging principle. Therefore, the image to be pasted after being shape-transformed according to the plane image also conforms to the monocular perspective imaging principle, that is, after mapping the image to be pasted whose shape has transformed into the spherical coordinate system, there is no distortion of the image to be pasted after being mapped, thus implementing the distortionless image pasting on the spherical panoramic image.

Certainly, any product or method implementing the present application is not necessarily required to achieve all the above advantages at the same time.

BRIEF DESCRIPTION OF THE DRAWINGS

In order to illustrate the technical solutions in the embodiments of the present application or the prior art more clearly, the following drawings, which are to be used in the description of the embodiments or the prior art, are briefly described below.

DETAILED DESCRIPTION

The technical solutions in the embodiments of the present application will be described below with reference to the accompanying drawings in the embodiments of the present application.

Figure 1:
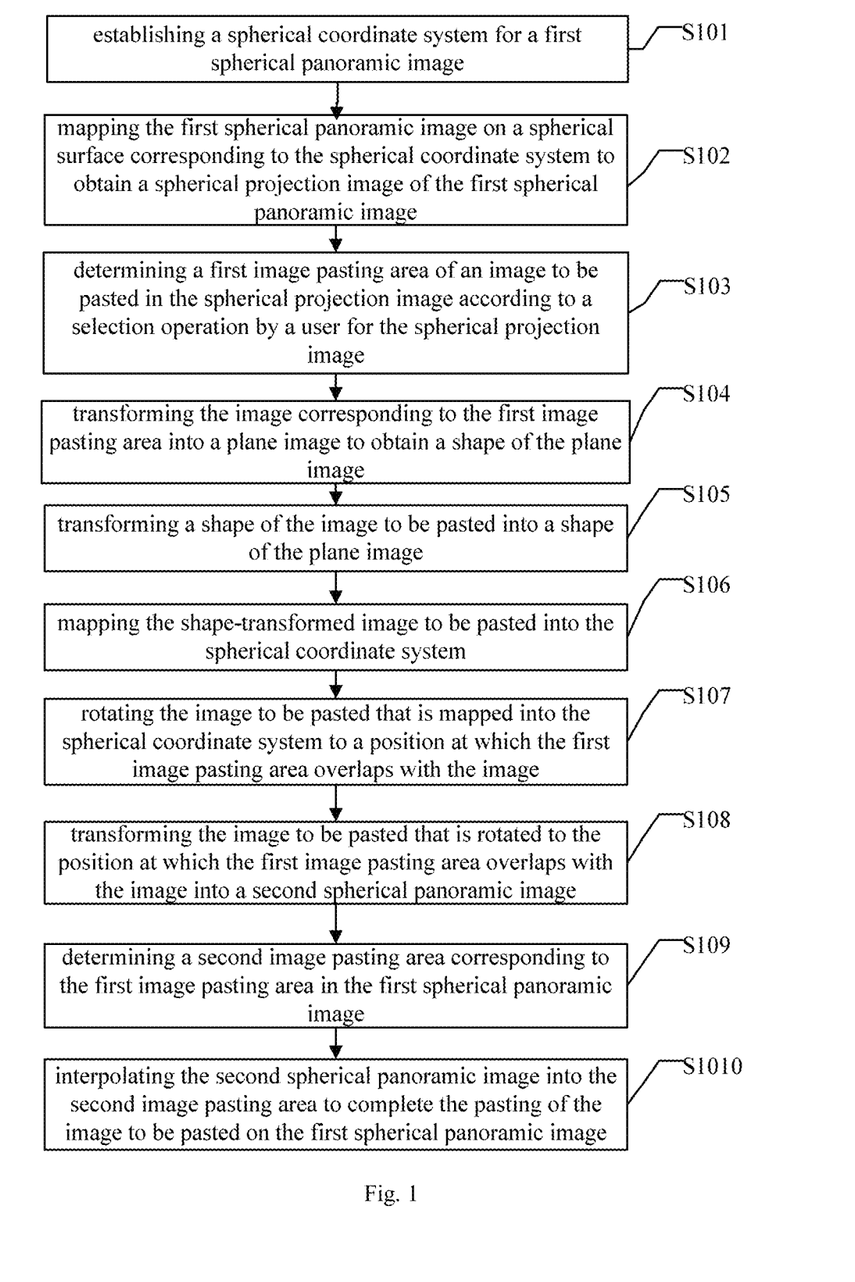
FIG. 1 is a flow diagram of a method for image pasting on a spherical panorama image provided in an embodiment of the present application.

FIG. 1 is a schematic flow diagram of a method for image pasting on a spherical panorama image provided in an embodiment of the present application, which may comprise:

S101: establishing a spherical coordinate system for a first spherical panoramic image.

Specifically, a spherical coordinate system M for the first spherical panoramic image A is established, wherein the first spherical panoramic image A is a image that covers 360 degrees field of view in horizontal direction and covers 180 degrees field of view in vertical direction, and the aspect ratio is 2:1.

Figure 2A:
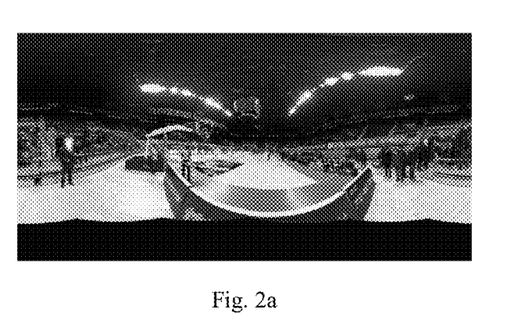
FIG. 2*a* is a schematic view of a first spherical panoramic image provided in an embodiment of the present application.

Exemplary, FIG. 2a is a schematic view of a first spherical panoramic image provided in an embodiment of the present application.

Typically, a spherical panorama image may be also called an equirectangular image.

S102: mapping the first spherical panoramic image on a spherical surface corresponding to the spherical coordinate system to obtain a spherical projection image of the first spherical panoramic image.

Specifically, there is a one-to-one correspondence between the coordinates of the first spherical panoramic image A and the coordinates in the spherical coordinate system M, thus the first spherical panoramic image A is projected onto the spherical surface of the spherical coordinate system M, and then the spherical projection image B corresponding to the spherical panoramic image A is obtained.

In the embodiments of the present application, a spherical panoramic image can be understood as a plane image (which is a 2D image conforming to the monocular imaging principle). This spherical panoramic image has a width and a height, and the coordinate system of the spherical panoramic image may be a xy coordinate system. Also, a spherical projection image can be understood as a curved image, such as a positive spherical curved surface image, or an ellipsoidal curved surface image. The spherical projection image may have a radius, and the coordinate system of the spherical projection image may be a latitude and longitude $(\lambda,\phi)$ coordinate system.

Specifically, the first spherical panoramic image A can be mapped on the spherical surface in the spherical coordinate system M according to the following formula:

$$(x, y) \to (\lambda, \phi) = \left( \arctan\left(\frac{x}{r}\right), \arccos\left( y * \frac{\cos\left(\arctan\left(\frac{x}{r}\right)\right)}{r} \right) \right),$$

wherein, (x,y) are the coordinates of the point on the first spherical panoramic image A; $(\lambda,\phi)$ are the coordinate of the point with coordinates of (x,y) that is projected into the spherical coordinate system M, wherein, $\lambda,\phi$ are respectively the longitude and latitude of the point on the spherical surface of the spherical coordinate system M;

$$r = \frac{n}{2\pi},$$

and r is the radius of the spherical projection image, and n is the width of the first spherical panoramic image.

S103: determining a first image pasting area of an image to be pasted in the spherical projection image according to a selection operation by a user for the spherical projection image.

Figure 2B:
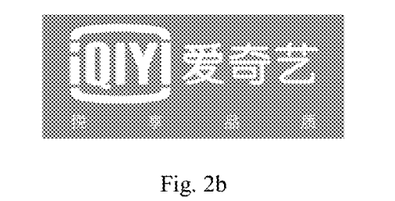
FIG. 2*b* is a schematic view of an image to be pasted provided in an embodiment of the present application.

The image to be pasted may be pre-acquired. Specifically, the image to be pasted may be designated by the user, or may be sent by other devices. For example, the image to be pasted may be as shown in FIG. 2b.

Assuming that the image pasting area selected by the user is a billboard in the spherical projection image corresponding to FIG. 2a, the first image pasting area may be determined based on the billboard. Typically, the user would like to determine the first image pasting area based on the vertices of the desired image pasting area. It should be understood that a plurality of vertices may be selected by the user, and the first image pasting area consisting of these vertices can be determined based on the selected vertices.

In a practical application, the user can also select a point on the spherical projection image B, and then the first image pasting area can be determined based on the point. For example, the point selected by the user is a point in an area where the pixel values of points are similar with each other, then the area can be taken as the first image pasting area, and so on, and the specific manner is not limited.

S104: transforming the image corresponding to the first image pasting area into a plane image to obtain a shape of the plane image.

According to the above description, the spherical projection image is a curved surface image, and the first image pasting area is an area in the spherical projection image. Therefore, the image corresponding to the first image pasting area is also a curved surface image, and the curved surface image corresponding to the first image pasting area is transformed into a plane image in S104.

The plane image is obtained by transforming the image within a partial area (first image pasting area) in the spherical projection image, thus the plane image is not a complete image of a regular size. For example, the spherical projection image contains a billboard, wherein after the image in the area where the billboard is located is transformed into a plane image, the plane image may be trapezoidal, or other non-rectangular shape due to the imaging principle of near-large and far-small.

Specifically, the central point coordinate of the first image pasting area can be determined; the spherical projection image may be rotated according to the central point coordinate. In a case that the coordinate is represented by longitude and latitude, the coordinate of the central point coordinate in the rotated spherical projection image is (0, 0); and the image corresponding to the first image pasting area in the rotated spherical projection image is transformed into a plane image according to the following formula:

$$(\lambda', \phi') \to (u, v) = r\left( \tan(\lambda'), \frac{\tan(\phi')}{\cos(\lambda')} \right),$$

wherein, $(\lambda',\phi')$ are coordinates in the spherical coordinate system of a point in the image corresponding to the first image pasting area in the rotated spherical projection image; $\lambda',\phi'$ are respectively a latitude and a longitude of a point in the image corresponding to the first image pasting area in the rotated spherical projection image; (u,v) are corresponding coordinates in plane-rectangular coordinate system of the point with coordinates of $(\lambda',\phi')$;

$$r = \frac{n}{2\pi},$$

r is radius of the spherical projection image, and n is width of the first spherical panoramic image.

In a practical application, the central point of the first image pasting area may be determined according to the following formula:

$$\begin{cases} \lambda_0 = \sum_{i=1}^{s} \frac{\lambda_i}{s} \\ \phi_0 = \sum_{i=1}^{s} \frac{\phi_i}{s} \end{cases},$$

wherein, $\lambda_0, \phi_0$ are respectively the longitude and the latitude of the central point of the first image pasting area in the spherical coordinate system M; s is the number of points selected by the user; $\lambda_i, \phi_i$ are respectively the longitude and the latitude of the i-th point in the s selected points in the first image pasting area.

The spherical projection image B is rotated according to the determined coordinate $(\lambda_0, \phi_0)$ of the central point, wherein, in a case that the coordinate is represented by longitude and latitude, the coordinate in the rotated spherical projection image of the central point with a coordinate of $(\lambda_0, \phi_0)$ is (0, 0).

The coordinates, in the stereo-rectangular coordinate system, of the point in the first image pasting area obtained after being rotated the spherical projection image B are determined according to the following formula:

$$\begin{bmatrix} x \\ y \\ z \end{bmatrix} = \begin{bmatrix} \cos(\phi_0)\cos(\lambda_0) & -\sin(\lambda_0) & -\sin(\phi_0)\cos(\lambda_0) \\ \cos(\phi_0)\cos(\lambda_0) & \cos(\lambda_0) & -\sin(\phi_0)\sin(\lambda_0) \\ \sin(\phi_0) & 0 & \cos(\phi_0) \end{bmatrix} \begin{bmatrix} \cos\lambda\cos\phi \\ \sin\phi\cos\lambda \\ \sin\phi \end{bmatrix},$$

wherein, x, y, z are values of the coordinates of the points in the first image pasting area on the x axis, y axis and z axis of the stereo-rectangular coordinate system, respectively; $(\lambda_0, \phi_0)$ is the coordinate of the central point of the first image pasting area; $\lambda_0, \phi_0$ are the latitude and the longitude of the central point of the first image pasting area; $\lambda, \phi$ are the longitude and the latitude corresponding to the point in the first image pasting area.

According to x, y, z, the coordinates of the points in the first image pasting area in the spherical coordinate system M are determined with the following formula:

$(x,y) \to (\lambda', \phi') = (\arctan(x), \arccos(y*\cos(\arctan(x))))$, wherein, (x,y) are coordinates of the point in the first image pasting area represented with the values of the x axis and the values of the y axis; x,y are the values of the point in the first image pasting area on the x axis and the y axis respectively; $(\lambda', \phi')$ are coordinates of the point in the first image pasting area in the spherical coordinate system M; $\lambda', \phi'$ are respectively the longitude and the latitude of the point in the first image pasting area.

The image corresponding to the first image pasting area is transformed into a plane image according to the following formula:

$$(\lambda', \phi') \to (u, v) = r\left(\tan(\lambda'), \frac{\tan(\phi')}{\cos(\lambda')}\right),$$

wherein, $(\lambda', \phi')$ is the coordinate, in the spherical coordinate system, of the point in the image which is in the rotated spherical projection image and corresponds to the first image pasting area; $\lambda', \phi'$ are the latitude and the longitude of a point in the image which is in the rotated spherical projection image and corresponds to the first image pasting area, respectively; (u,v) is the coordinate of the corresponding point whose coordinate is $(\lambda', \phi')$ in plane-rectangular coordinate system;

$$r = \frac{n}{2\pi},$$

r is the radius of the spherical projection image, and n is the width of the first spherical panoramic image.

S105: transforming a shape of the image to be pasted into a shape of the plane image.

According to the above description, when an image in the first image pasting area is transformed into a plane image, the plane image may be trapezoidal, or other non-rectangular shape due to the imaging principle of near-large and far-small. Here assuming that the shape of the plane image is trapezoidal. As shown in FIG. 2b, the shape of the image to be pasted is rectangular, then the rectangle would be transformed into a trapezoid.

Specifically, a homography matrix can be determined according to the plane image and the image to be pasted; a plane perspective transformation is performed on the image to be pasted according to the homography matrix to transform the shape of the image to be pasted into the shape of the plane image.

In a practical application, assuming that the determined first image pasting area is C, and the plane image obtained according to C in S104 is D. The homography matrix H is determined according to the correspondence between the vertices of the plane image D and the vertices of the image P to be pasted. Then, according to H and with the formula, the image P to be pasted is subjected to a plane perspective transformation to transform the image P to be pasted into the shape of the plane image D to obtain the transformed image P' to be pasted.

In the case that the user selects a point on the spherical projection image B in S103, the homography matrix H between the plane image D and the image P to be pasted is $$\begin{bmatrix} 1 & 0 & 0 \\ 0 & 1 & 0 \\ 0 & 0 & 1 \end{bmatrix},$$

and then a plane perspective transformation is performed on the image P to be pasted according to $$\begin{bmatrix} 1 & 0 & 0 \\ 0 & 1 & 0 \\ 0 & 0 & 1 \end{bmatrix}.$$

Typically, there is no change in the shape of the image obtained after being performed the plane perspective transformation on the image P to be pasted with matrix $$\begin{bmatrix} 1 & 0 & 0 \\ 0 & 1 & 0 \\ 0 & 0 & 1 \end{bmatrix}$$

and the image P to be pasted.

S106: mapping the shape-transformed image to be pasted into the spherical coordinate system.

Specifically, the shape-transformed image to be pasted can be mapped into the spherical coordinate system according to the following formula:

$$(u, v) \to (\lambda, \phi) = \left( \arctan\left(\frac{u}{r}\right), \arccos\left(v * \frac{\cos\left(\arctan\left(\frac{u}{r}\right)\right)}{r}\right) \right),$$

wherein, (u,v) are coordinates in the plane coordinate system of a point in the shape-transformed image to be pasted; (λ,φ) are coordinates of the point with coordinates of (u,v) that are mapped into the spherical coordinate system;

$$r = \frac{n}{2\pi},$$

r is radius of the spherical projection image, and n is width of the first spherical panoramic image.

Typically, the shape-transformed image to be pasted is mapped to the spherical coordinate system at the assigned viewing angle (the longitude and the latitude of the central point of viewing angle are both zero).

S107: rotating the image to be pasted that is mapped into the spherical coordinate system to a position at which the first image pasting area overlaps with the image.

It should be understood that the image to be pasted is pre-acquired, and after mapping the image to be pasted into the spherical coordinate system, the positional relationship between the image to be pasted and the spherical projection image is not fixed. Therefore, it is necessary to rotate the image to be pasted into a position in the spherical projection image coinciding with the first image pasting area.

Specifically, assuming that the image to be pasted which has mapped into the spherical coordinate system M is P'', and the image P''' to be pasted is rotated to a position coinciding with the first image pasting area.

In a practical application, the coordinate, in the stereo-rectangular coordinate system, of the point in the image P''' to be pasted after being rotated is determined according to the following formula:

$$\begin{bmatrix} x' \\ y' \\ z' \end{bmatrix} = \begin{bmatrix} \cos(-\phi_0)\cos(-\lambda_0) & \sin(-\lambda_0) & \sin(-\phi_0)\cos(-\lambda_0) \\ \cos(-\phi_0)\cos(-\lambda_0) & \cos(-\lambda_0) & \sin(-\phi_0)\sin(-\lambda_0) \\ \sin(-\phi_0) & 0 & \cos(-\phi_0) \end{bmatrix} \begin{bmatrix} \cos\lambda\cos\phi \\ \sin\phi\cos\lambda \\ \sin\phi \end{bmatrix},$$

wherein x', y', z' is corresponding values of x axis, y axis and z axis, in the stereo-rectangular coordinate system, of the points in the image P''' to be pasted after being rotated; $\lambda_0, \phi_0$ are the latitude and the longitude of the central point of the first image pasting area respectively; and λ,φ are the longitude and the latitude corresponding to the point in the image P''' to be pasted after being rotated.

According to the x', y', z', the coordinates, in the spherical coordinate system M, of the points in the image P''' to be pasted after being rotated are determined with the following formula:

$$(x',y') \to (\lambda',\phi') = (\arctan(x'), \arccos(y'*\cos(\arctan(x')))) ,$$

wherein, (x',y') is the coordinate, represented by the values of the x axis and the values of the y axis, of the points in the image P''' to be pasted after being rotated; x',y' are the values of the point in the image P''' to be pasted after being rotated on the x axis and the y axis respectively; (λ',φ') is the coordinate of the point whose coordinate is (x',y') in the spherical coordinate system M; λ',φ' are the longitude and the latitude of the point in the image P''' to be pasted after being rotated respectively.

S108: transforming the image to be pasted that is rotated to the position at which the first image pasting area overlaps with the image into a second spherical panoramic image.

According to the above description, the spherical panoramic image can be understood as a plane image (which is a 2D image conforming to the monocular imaging principle). The spherical panoramic image has a width and a height, and the coordinate system of the spherical panoramic image can be a xy coordinate system. While the image to be pasted herein has been transformed into a curved surface image after being mapped in S106. In S108, it is necessary to transform the image to be pasted which has been transformed into a curved surface image into a plane image (second spherical panoramic image) again.

Specifically, the image to be pasted that is rotated to the position, at which the first image pasting area overlaps with the image, can be transformed into the second spherical panoramic image according to the following formula;

$$(\lambda', \phi') \to (x, y) = \left( (m-1) - \left( \frac{\phi' + \frac{\pi}{2}}{\pi} \right)(m-1), \left( \frac{\lambda' + \phi'}{2\pi} \right)(n-1) \right),$$

wherein, (λ',φ') are coordinates in the spherical coordinate system of a point in the image to be pasted that is rotated to the position, at which the first image pasting area overlaps with the image; λ',φ' are respectively a longitude and a latitude of a point in the image to be pasted that is rotated to the position, at which the first image pasting area overlaps with the image; (x,y) are coordinates of a point with coordinates of (λ',φ') that are mapped into the plane coordinate system; m and n are respectively height and width of the first spherical panoramic image.

In a practical application, according to the coordinate (λ',φ'), obtained in S107, of the point in the image to be pasted which has been rotated to the position coinciding with the first image pasting area, the image P''' to be pasted after being rotated is transformed into a second spherical panoramic image with the following formula:

$$(\lambda', \phi') \to (x, y) = \left( (m-1) - \left( \frac{\phi' + \frac{\pi}{2}}{\pi} \right)(m-1), \left( \frac{\lambda' + \phi'}{2\pi} \right)(n-1) \right),$$

wherein, (λ',φ') is the coordinate, in the spherical coordinate system, of the point in the image P''' to be pasted after being rotated; λ',φ' are the longitude and the latitude of the point in the image P''' to be pasted after being rotated; (x,y) is the coordinate, in the plane-rectangular coordinate system, of the point whose coordinate is (λ',ϕ'); m, n are the length and width of the first spherical panoramic image respectively.

S109: determining a second image pasting area corresponding to the first image pasting area in the first spherical panoramic image.

Specifically, a second image pasting area corresponding to the first image pasting area in the first spherical panoramic image A.

In order to distinguish the description, herein, the image pasting area in the first spherical panoramic image is referred to as the second image pasting area, and the image pasting area in the spherical projection image is referred to as the first image pasting area.

S1010: interpolating the second spherical panoramic image into the second image pasting area to complete the pasting of the image to be pasted on the first spherical panoramic image.

Specifically, the second spherical panoramic image is interpolated into the second image pasting area based on the second image pasting area determined in S109 to complete mapping the image to be pasted on the first panoramic image. It should be understood that the second spherical panoramic image herein is transformed from the image to be pasted, and mapping the image to be pasted on the first spherical panorama image is completed by interpolating the second spherical panoramic image into the image pasting area (second image pasting area) in the first spherical panoramic image.

It should be noted that interpolating the second spherical panoramic image into the second image pasting area is the prior art, and will not be described here.

Figure 2C:
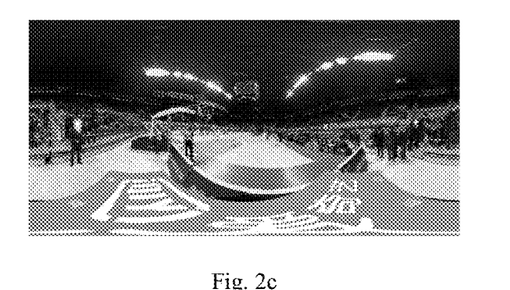
FIG. 2*c* is a schematic view of the first result of mapping an image to be pasted on a spherical panorama image provided in an embodiment of the present application.

In the case that the user selects a point in the spherical projection image, exemplary, FIG. 2c is a schematic view of result of mapping an image to be pasted on a spherical panorama image provided in an embodiment of the present application.

Figure 2D:
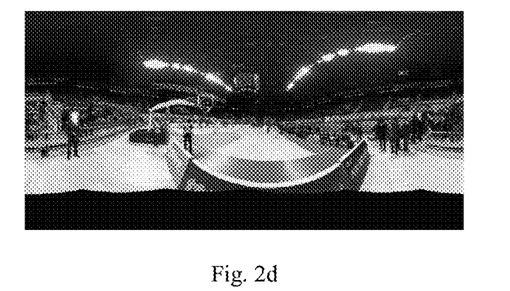
FIG. 2*d* is a schematic view of the second result of mapping an image to be pasted on a spherical panorama image provided in an embodiment of the present application.

In the case that the user selects four vertices of the billboard in the spherical projection image, exemplary, FIG. 2d is a schematic view of result of mapping an image to be pasted on a spherical panorama image provided in an embodiment of the present application.

With implementing the embodiments of the present application, the image corresponding to the first image pasting area is transformed into a plane image, which is a plane image conforming to the monocular perspective imaging principle. Therefore, the image to be pasted after being transformed its shape based on the plane image also conforms to the monocular perspective imaging principle, that is, after mapping the image to be pasted being transformed its shape into the spherical coordinate system, there is no distortion of the image to be pasted after being mapped, thus implementing the distortionless image pasting on the spherical panoramic image.

Figure 3:
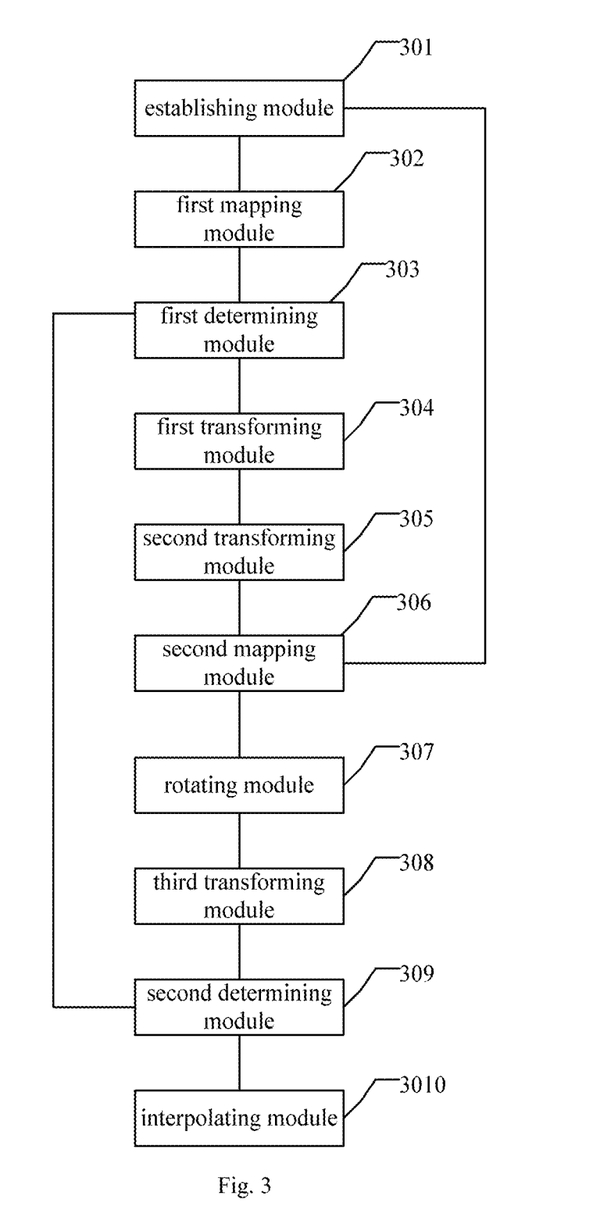
FIG. 3 is a schematic structural view of a device for image pasting on a spherical panorama image provided in an embodiment of the present application.

Corresponding to the method embodiment shown in FIG. 1, FIG. 3 is a schematic structural view of a device for image pasting on a spherical panorama image provided in an embodiment of the present application, and may comprise a establishing module 301, a first mapping module 302, a first determining module 303, a first transforming module 304, a second transforming module 305, a second mapping module 306, a rotating module 307, a third transforming module 308, a second determining module 309, and an interpolating module 3010, wherein, the establishing module 301 is used for establishing a spherical coordinate system for a first spherical panoramic image;

the first mapping module 302 is used for mapping the first spherical panoramic image on a spherical surface corresponding to the spherical coordinate system to obtain a spherical projection image of the first spherical panoramic image;

the first determining module 303 is used for determining a first image pasting area of an image to be pasted in the spherical projection image according to a selection operation by a user for the spherical projection image;

the first transforming module 304 is used for transforming the image corresponding to the first image pasting area into a plane image.

Specifically, the first transforming module 304 is specifically used for:

determining central point coordinates of the first image pasting area; rotating the spherical projection image according to the central point coordinates, wherein the central point coordinates in the rotated spherical projection image are (0, 0) in a case that the coordinates are represented by longitude and latitude;

transforming the image corresponding to the first image pasting area in the rotated spherical projection image into the plane image according to the following formula:

$$(\lambda', \phi') \to (u, v) = r\left(\tan(\lambda'), \frac{\tan(\phi')}{\cos(\lambda')}\right),$$

wherein, (λ',ϕ') are coordinates in the spherical coordinate system of a point in the image corresponding to the first image pasting area in the rotated spherical projection image; λ',ϕ' are respectively a latitude and a longitude of a point in the image corresponding to the first image pasting area in the rotated spherical projection image; (u,v) are corresponding coordinates in plane-rectangular coordinate system of the point with coordinates of (λ',ϕ');

$$r = \frac{n}{2\pi},$$

r is radius of the spherical projection image, and n is width of the first spherical panoramic image.

The second transforming module 305 is used for transforming a shape of the image to be pasted into a shape of the plane image.

Specifically, the second transforming module 305 is specifically used for:

determining a homography matrix according to the plane image and the image to be pasted; and performing a plane perspective transformation on the image to be pasted according to the homography matrix to transform the shape of the image to be pasted into the shape of the plane image.

The second mapping module 306 is used for mapping the shape-transformed image to be pasted into the spherical coordinate system.

Specifically, the second mapping module 306 is specifically used for:

mapping the shape-transformed image to be pasted into the spherical coordinate system according to the following formula:

$$(u, v) \to (\lambda, \phi) = \left(\arctan\left(\frac{u}{r}\right), \arccos\left(v * \frac{\cos\left(\arctan\left(\frac{u}{r}\right)\right)}{r}\right)\right),$$

wherein, (u,v) are coordinates in the plane coordinate system of a point in the shape-transformed image to be pasted; (λ,φ) are coordinates of the point with coordinates of (u,v) that are mapped into the spherical coordinate system;

$$r = \frac{n}{2\pi},$$

r is radius of the spherical projection image, and n is width of the first spherical panoramic image.

The rotating module 307 is used for rotating the image to be pasted that is mapped into the spherical coordinate system to a position at which the first image pasting area overlaps with the image.

The third transforming module 308 is used for transforming the image to be pasted that is rotated to the position at which the first image pasting area overlaps with the image into a second spherical panoramic image.

Specifically, the third transforming module 308 is specifically used for:

transforming the image to be pasted that is rotated to the position, at which the first image pasting area overlaps with the image, into the second spherical panoramic image according to the following formula:

$$(\lambda', \phi') \to (x, y) = \left((m-1) - \left(\frac{\phi' + \frac{\pi}{2}}{\pi}\right)(m-1), \left(\frac{\lambda' + \phi'}{2\pi}\right)(n-1)\right),$$

wherein, (λ',φ') are coordinates in the spherical coordinate system of a point in the image to be pasted that is rotated to the position, at which the first image pasting area overlaps with the image; λ',φ' are respectively a longitude and a latitude of a point in the image to be pasted that is rotated to the position, at which the first image pasting area overlaps with the image; (x,y) are coordinates of a point with coordinates of (λ',φ') that are mapped into the plane coordinate system; m and n are respectively height and width of the first spherical panoramic image.

The second determining module 309 is used for determining a second image pasting area corresponding to the first image pasting area in the first spherical panoramic image.

The interpolating module 3010 is used for interpolating the second spherical panoramic image into the second image pasting area to complete mapping the image to be pasted on the first spherical panoramic image.

In the embodiments of the present application, the image corresponding to the first image pasting area is transformed into a plane image, which is a plane image conforming to the monocular perspective imaging principle. Therefore, the image to be pasted after being transformed its shape according to the plane image also conforms to the monocular perspective imaging principle, that is, after mapping the image to be pasted whose shape been transformed into the spherical coordinate system, there is no distortion of the image to be pasted after being mapped, thus implementing the distortionless image pasting on the spherical panoramic image.

Figure 4:
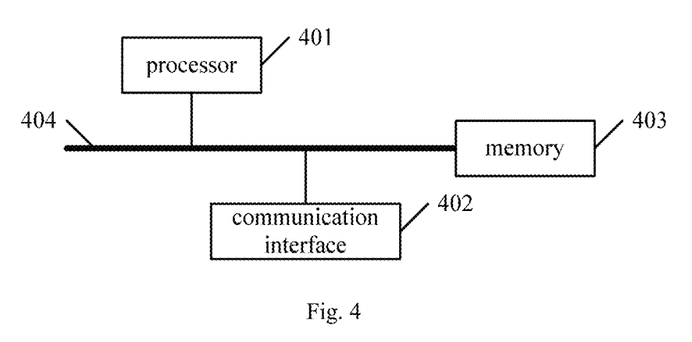
FIG. 4 is a schematic structural view of an electronic device provided in an embodiment of the present application.

The present embodiment also provides an electronic device, as shown in FIG. 4, including a processor 401, a communication interface 402, a memory 403, and a communication bus 404, wherein mutual communication between the processor 401, the communication interface 402, and the memory 403 is accomplished via the communication bus 404, the memory 403 is used for storing a computer program;

the processor 401 is used for implementing the following steps when the program stored in the memory 403 is executed:

establishing a spherical coordinate system for a first spherical panoramic image;

mapping the first spherical panoramic image on a spherical surface corresponding to the spherical coordinate system to obtain a spherical projection image of the first spherical panoramic image;

determining a first image pasting area of an image to be pasted in the spherical projection image according to a selection operation by a user for the spherical projection image;

transforming the image corresponding to the first image pasting area into a plane image;

transforming a shape of the image to be pasted into a shape of the plane image;

mapping the shape-transformed image to be pasted into the spherical coordinate system;

rotating the image to be pasted that is mapped into the spherical coordinate system to a position at which the first image pasting area overlaps with the image;

transforming the image to be pasted that is rotated to the position at which the first image pasting area overlaps with the image into a second spherical panoramic image;

determining a second image pasting area corresponding to the first image pasting area in the first spherical panoramic image; and interpolating the second spherical panoramic image into the second image pasting area to complete the pasting of the image to be pasted on the first spherical panoramic image.

In an implementation, the processor 401 is also used for implementing the following steps when the program stored in the memory 403 is executed:

determining central point coordinates of the first image pasting area;

rotating the spherical projection image according to the central point coordinates, wherein the central point coordinates in the rotated spherical projection image are (0, 0) in a case that the coordinates are represented by longitude and latitude;

transforming the image corresponding to the first image pasting area in the rotated spherical projection image into the plane image according to the following formula:

$$(\lambda', \phi') \to (u, v) = r\left(\tan(\lambda'), \frac{\tan(\phi')}{\cos(\lambda')}\right),$$

wherein, (λ',φ') are coordinates in the spherical coordinate system of a point in the image corresponding to the first image pasting area in the rotated spherical projection image; λ',φ' are respectively a latitude and a longitude of a point in the image corresponding to the first image pasting area in the rotated spherical projection image; (u,v) are corresponding coordinates in plane-rectangular coordinate system of the point with coordinates of (λ',φ');

$$r = \frac{n}{2\pi},$$

r is radius of the spherical projection image, and n is width of the first spherical panoramic image.

In an implementation, the processor 401 is also used for implementing the following steps when the program stored in the memory 403 is executed:

determining a homography matrix according to the plane image and the image to be pasted; and performing a plane perspective transformation on the image to be pasted according to the homography matrix to transform the shape of the image to be pasted into the shape of the plane image.

In an implementation, the processor 401 is also used for implementing the following steps when the program stored in the memory 403 is executed:

mapping the shape-transformed image to be pasted into the spherical coordinate system according to the following formula:

$$(u, v) \to (\lambda, \phi) = \left(\arctan\left(\frac{u}{r}\right), \arccos\left(v * \frac{\cos\left(\arctan\left(\frac{u}{r}\right)\right)}{r}\right)\right),$$

wherein, (u,v) are coordinates in the plane coordinate system of a point in the shape-transformed image to be pasted; ($\lambda,\phi$) are coordinates of the point with coordinates of (u,v) that are mapped into the spherical coordinate system;

$$r = \frac{n}{2\pi},$$

r is radius of the spherical projection image, and n is width of the first spherical panoramic image.

In an implementation, the processor 401 is also used for implementing the following steps when the program stored in the memory 403 is executed:

transforming the image to be pasted that is rotated to the position, at which the first image pasting area overlaps with the image, into the second spherical panoramic image according to the following formula:

$$(\lambda', \phi') \to (x, y) = \left((m-1) - \left(\frac{\phi' + \frac{\pi}{2}}{\pi}\right)(m-1), \left(\frac{\lambda' + \phi'}{2\pi}\right)(n-1)\right),$$

wherein, ($\lambda',\phi'$) are coordinates in the spherical coordinate system of a point in the image to be pasted that is rotated to the position, at which the first image pasting area overlaps with the image; $\lambda',\phi'$ are respectively a longitude and a latitude of a point in the image to be pasted that is rotated to the position, at which the first image pasting area overlaps with the image; (x,y) are coordinates of a point with coordinates of ($\lambda',\phi'$) that are mapped into the plane coordinate system; m and n are respectively height and width of the first spherical panoramic image.

The communication bus mentioned by the above electronic device may be a Peripheral Component Interconnect (PCI) bus or an Extended Industry Standard Architecture (EISA) bus and so on. The communication bus can be divided into an address bus, a data bus, a control bus and so on. For ease of representation, the figure is represented only with one thick line, but which does not represent that there is only one bus or one kind of bus.

The communication interface is used for communication between the above electronic device and other devices.

The memory may include a Random Access Memory (RAM), or may include a Non-Volatile Memory (NVM), such as at least one disk memory. Optionally, the memory may also be at least one storage device which is located remote from the preceding processor.

The above processor can be a general processor, including a Central Processing Unit (CPU), a Network Processor (NP) and so on; it can also be a Digital Signal Processing (DSP), an Application Specific Integrated Circuit (ASIC), a Field-Programmable Gate Array (FPGA) or other programmable logic device, discrete gate or transistor logic device, discrete hardware component.

With implementing the embodiment of the present application as shown in FIG. 4, the image corresponding to the first image pasting area is transformed into a plane image, which is a plane image conforming to the monocular perspective imaging principle. Therefore, the image to be pasted after being transformed its shape according to the plane image also conforms to the monocular perspective imaging principle, that is, after mapping the image to be pasted whose shape has been transformed into the spherical coordinate system, there is no distortion of the image to be pasted after being mapped, thus implementing the distortionless image pasting on the spherical panoramic image.

The embodiment of the present application also provides a computer readable storage medium storing a computer program thereon; and when being executed by a processor, the computer program is able to implement the following steps:

establishing a spherical coordinate system for a first spherical panoramic image;

mapping the first spherical panoramic image on a spherical surface corresponding to the spherical coordinate system to obtain a spherical projection image of the first spherical panoramic image;

determining a first image pasting area of an image to be pasted in the spherical projection image according to a selection operation by a user for the spherical projection image;

transforming the image corresponding to the first image pasting area into a plane image;

transforming a shape of the image to be pasted into a shape of the plane image;

mapping the shape-transformed image to be pasted into the spherical coordinate system;

rotating the image to be pasted that is mapped into the spherical coordinate system to a position at which the first image pasting area overlaps with the image;

transforming the image to be pasted that is rotated to the position at which the first image pasting area overlaps with the image into a second spherical panoramic image;

determining a second image pasting area corresponding to the first image pasting area in the first spherical panoramic image; and interpolating the second spherical panoramic image into the second image pasting area to complete the pasting of the image to be pasted on the first spherical panoramic image.

In an implementation, the following steps can be performed when the computer program being executed by the processor:

determining central point coordinates of the first image pasting area;

rotating the spherical projection image according to the central point coordinates, wherein the central point coordinates in the rotated spherical projection image are (0, 0) in a case that the coordinates are represented by longitude and latitude;

transforming the image corresponding to the first image pasting area in the rotated spherical projection image into the plane image according to the following formula:

$$(\lambda', \phi') \to (u, v) = r\left(\tan(\lambda'), \frac{\tan(\phi')}{\cos(\lambda')}\right),$$

wherein, $(\lambda',\phi')$ are coordinates in the spherical coordinate system of a point in the image corresponding to the first image pasting area in the rotated spherical projection image; $\lambda',\phi'$ are respectively a latitude and a longitude of a point in the image corresponding to the first image pasting area in the rotated spherical projection image; $(u,v)$ are corresponding coordinates in plane-rectangular coordinate system of the point with coordinates of $(\lambda',\phi')$;

$$r = \frac{n}{2\pi},$$

r is radius of the spherical projection image, and n is width of the first spherical panoramic image.

In an implementation, the following steps can be implemented when the computer program being executed by the processor:

determining a homography matrix according to the plane image and the image to be pasted;

and performing a plane perspective transformation on the image to be pasted according to the homography matrix to transform the shape of the image to be pasted into the shape of the plane image.

In an implementation, the processor 401 is also used for implementing the following steps when the program stored in the memory 403 is executed:

mapping the shape-transformed image to be pasted into the spherical coordinate system according to the following formula:

$$(u, v) \to (\lambda, \phi) = \left(\arctan\left(\frac{u}{r}\right), \arccos\left(v * \frac{\cos\left(\arctan\left(\frac{u}{r}\right)\right)}{r}\right)\right),$$

wherein, $(u,v)$ are coordinates in the plane coordinate system of a point in the shape-transformed image to be pasted; $(\lambda,\phi)$ are coordinates of the point with coordinates of $(u,v)$ that are mapped into the spherical coordinate system;

$$r = \frac{n}{2\pi},$$

r is radius of the spherical projection image, and n is width of the first spherical panoramic image.

In an implementation, the following steps can be implemented when the computer program being executed by the processor:

transforming the image to be pasted that is rotated to the position, at which the first image pasting area overlaps with the image, into the second spherical panoramic image according to the following formula:

$$(\lambda', \phi') \to (x, y) = \left((m-1) - \left(\frac{\phi' + \frac{\pi}{2}}{\pi}\right)(m-1), \left(\frac{\lambda' + \phi'}{2\pi}\right)(n-1)\right),$$

wherein, $(\lambda',\phi')$ are coordinates in the spherical coordinate system of a point in the image to be pasted that is rotated to the position, at which the first image pasting area overlaps with the image; $\lambda',\phi'$ are respectively a longitude and a latitude of a point in the image to be pasted that is rotated to the position, at which the first image pasting area overlaps with the image; $(x,y)$ are coordinates of a point with coordinates of $(\lambda',\phi')$ that are mapped into the plane coordinate system; m and n are respectively height and width of the first spherical panoramic image.

The embodiment of the present application also provides a computer program that is able to implement any one of the above methods for image pasting on a spherical panoramic image when being executed.

In the above embodiments, it may be implemented in whole or in part by software, hardware, firmware, or any combination thereof. When it is implemented by using the software, it may be implemented in whole or in part in the form of a computer program product. The computer program product includes one or more computer instructions. When the computer program instructions are uploaded and executed in the computer, the process or function described in the embodiments of the present application are generated in whole or in part. The computer may be a general computer, a dedicated computer, a computer network or other programmable devices. The computer instructions can be stored in a computer readable storage medium or can be transmitted from a computer readable storage medium to another computer readable storage medium. For example, the computer instructions can be transmitted from a website, computer, server or data centre to another website, computer, server or data centre in a wired way (for example coaxial cable, optical fiber, digital subscriber line (DSL)) or a wireless way (for example infrared, wireless, microwave and so on). The computer readable storage medium can be any available medium which can be accessed by a computer, or a data storage device such as a server, a data centre and so on that includes one or more available medium integrations. The available medium can be a magnetic medium (for example soft disk, hard disk, magnetic tape), a optical medium (for example DVD) or a semiconductor medium (for example Solid State Disk (SSD)) and so on.

It should be noted that the relationship terms herein such as "first", "second" and the like are only used for distinguishing one entity or operation from another entity or operation, but do not necessarily require or imply that there is any such actual relationship or sequence between these entities or operations. Moreover, the terms "comprise", "include" or any variants thereof are intended to cover a non-exclusive inclusion, such that processes, methods, articles or devices comprising a series of elements include not only those elements listed, but also other elements not specifically listed or the elements intrinsic to those processes, methods, articles, or devices. Without further limitations, elements limited by the statement "comprise(s) a/an . . . " do not exclude that there are additional identical elements in the processes, methods, articles, or devices which include the listed elements.

Various embodiments in the present description are described in a correlated manner, and identical or similar parts in various embodiments can be referred to one another, the description for each embodiment all focuses on the differences with other embodiments. Especially, for the device embodiments, equipment embodiments, computer readable medium embodiments, computer program embodiments, since they substantially similar to the method embodiments, the descriptions of which are simple, and related contents of which could refer to the part description of the method embodiments.

It will be understood by those ordinary skilled in the art that implementation of all or part of the steps in implementing the method embodiments described above may be accomplished by means of a program to instruct the associated hardware, the program may be stored in a computer readable storage medium, the storage medium referred to herein, for example is: ROM/RAM, a disk, CD and so on.

The above description is only preferred embodiments of the present application and is not intended to limit the present application. Any modifications, equivalent substitutions, improvements and the like within the spirit and principle of the present application are intended to be included within the scope of the present application.

What is claimed is:

1. A method for performing image pasting on a spherical panoramic image, wherein, the method comprises:

establishing a spherical coordinate system for a first spherical panoramic image;

mapping the first spherical panoramic image on a spherical surface corresponding to the spherical coordinate system to obtain a spherical projection image of the first spherical panoramic image;

determining a first image pasting area of an image to be pasted in the spherical projection image according to a selection operation by a user for the spherical projection image;

transforming the image corresponding to the first image pasting area into a plane image;

transforming a shape of the image to be pasted into a shape of the plane image;

mapping the shape-transformed image to be pasted into the spherical coordinate system;

rotating the image to be pasted that is mapped into the spherical coordinate system to a position at which the first image pasting area overlaps with the image;

transforming the image to be pasted that is rotated to the position at which the first image pasting area overlaps with the image into a second spherical panoramic image;

determining a second image pasting area corresponding to the first image pasting area in the first spherical panoramic image; and interpolating the second spherical panoramic image into the second image pasting area to complete pasting of the image to be pasted on the first spherical panoramic image, wherein, transforming the image corresponding to the first image pasting area into the plane image comprises:

determining central point coordinates of the first image pasting area;

rotating the spherical projection image according to the central point coordinates, wherein the central point coordinates in the rotated spherical projection image are (0, 0) in a case that the central point coordinates are represented by longitude and latitude; and transforming the image corresponding to the first image pasting area in the rotated spherical projection image into the plane image according to the following formula:

$$(\lambda', \phi') \rightarrow (u, v) = r\left(\tan(\lambda'), \frac{\tan(\phi')}{\cos(\lambda')}\right),$$

wherein (λ',φ') are coordinates in the spherical coordinate system of a point in the image corresponding to the first image pasting area in the rotated spherical projection image, (λ',φ') are respectively a latitude and a longitude of the point in the image corresponding to the first image pasting area in the rotated spherical projection image, (u, v) are corresponding coordinates in a plane-rectangular coordinate system of the point with coordinates of (λ',φ'), $$r = \frac{n}{2\pi},$$

r is a radius of the spherical projection image, and n is a width of the first spherical panoramic image.

2. The method according to claim 1, wherein, transforming a shape of the image to be pasted into a shape of the plane image comprises:

determining a homography matrix according to the correspondence between vertices of the plane image and the vertices of the image to be pasted; and performing a plane perspective transformation on the image to be pasted according to the homography matrix to transform the shape of the image to be pasted into the shape of the plane image.

3. The method according to claim 1, wherein, mapping the shape-transformed image to be pasted into the spherical coordinate system comprises:

mapping the shape-transformed image to be pasted into the spherical coordinate system according to the following formula:

$$(u, v) \rightarrow (\lambda, \phi) = \left(\arctan\left(\frac{u}{r}\right), \arccos\left(v * \frac{\cos\left(\arctan\left(\frac{u}{r}\right)\right)}{r}\right)\right),$$

wherein, (u, v) are coordinates in the plane coordinate system of a point in the shape-transformed image to be pasted; (λ, φ) are coordinates of the point with coordinates of (u, v) that are mapped into the spherical coordinate system;

$$r = \frac{n}{2\pi},$$

r is radius of the spherical projection image, and n is width of the first spherical panoramic image.

4. The method according to claim 1, wherein, transforming the image to be pasted that is rotated to the position, at which the first image pasting area overlaps with the image, into a second spherical panoramic image comprises:

transforming the image to be pasted that is rotated to the position, at which the first image pasting area overlaps with the image, into the second spherical panoramic image according to the following formula:

$$(\lambda', \phi') \to (x, y) = \left((m-1) - \left(\frac{\phi' + \frac{\pi}{2}}{\pi}\right)(m-1), \left(\frac{\lambda' + \phi'}{2\pi}\right)(n-1)\right),$$

wherein, (λ',ϕ') are coordinates in the spherical coordinate system of a point in the image to be pasted that is rotated to the position, at which the first image pasting area overlaps with the image; λ',ϕ' are respectively a longitude and a latitude of a point in the image to be pasted that is rotated to the position, at which the first image pasting area overlaps with the image; (x,y) are coordinates of a point with coordinates of (λ',ϕ') that are mapped into the plane coordinate system; m and n are respectively height and width of the first spherical panoramic image.

5. A device for performing image pasting on a spherical panoramic image, wherein, the device comprises: a establishing module, a first mapping module, a first determining module, a first transforming module, a second transforming module, a second mapping module, a rotating module, a third transforming module, a second determining module, and an interpolating module, wherein, the establishing module is used for establishing a spherical coordinate system for a first spherical panoramic image;

the first mapping module is used for mapping the first spherical panoramic image on a spherical surface corresponding to the spherical coordinate system to obtain a spherical projection image of the first spherical panoramic image;

the first determining module is used for determining a first image pasting area of an image to be pasted in the spherical projection image according to a selection operation by a user for the spherical projection image;

the first transforming module is used for transforming the image corresponding to the first image pasting area into a plane image;

the second transforming module is used for transforming a shape of the image to be pasted into a shape of the plane image;

the second mapping module is used for mapping the shape-transformed image to be pasted into the spherical coordinate system;

the rotating module is used for rotating the image to be pasted that is mapped into the spherical coordinate system to a position at which the first image pasting area overlaps with the image;

the third transforming module is used for transforming the image to be pasted that is rotated to the position at which the first image pasting area overlaps with the image into a second spherical panoramic image;

the second determining module is used for determining a second image pasting area corresponding to the first image pasting area in the first spherical panoramic image; and the interpolating module is used for interpolating the second spherical panoramic image into the second image pasting area to complete the pasting of the image to be pasted on the first spherical panoramic image, wherein, the first transforming module is specifically used for:

determining central point coordinates of the first image pasting area;

rotating the spherical projection image according to the central point coordinates, wherein the central point coordinates in the rotated spherical projection image are (0, 0) in a case that the central point coordinates are represented by longitude and latitude; and transforming the image corresponding to the first image pasting area in the rotated spherical projection image into the plane image according to the following formula:

$$(\lambda', \phi') \to (u, v) = r\left(\tan(\lambda'), \frac{\tan(\phi')}{\cos(\lambda')}\right),$$

wherein, (λ',ϕ') are coordinates in the spherical coordinate system of a point in the image corresponding to the first image pasting area in the rotated spherical projection image, (λ',ϕ') are respectively a latitude and a longitude of the point in the image corresponding to the first image pasting area in the rotated spherical projection image, (u, v) are corresponding coordinates in a plane-rectangular coordinate system of the point with coordinates of (λ',ϕ'), $$r = \frac{n}{2\pi},$$

r is a radius of the spherical projection image, and n is a width of the first spherical panoramic image.

6. The device according to claim 5, wherein, the second transforming module is specifically used for:

determining a homography matrix according to the correspondence between vertices of the plane image and the vertices of the image to be pasted; and performing a plane perspective transformation on the image to be pasted according to the homography matrix to transform the shape of the image to be pasted into the shape of the plane image.

7. The device according to claim 5, wherein, the second mapping module is specifically used for:

mapping the shape-transformed image to be pasted into the spherical coordinate system according to the following formula:

$$(u, v) \to (\lambda, \phi) = \left(\arctan\left(\frac{u}{r}\right), \arccos\left(v * \frac{\cos\left(\arctan\left(\frac{u}{r}\right)\right)}{r}\right)\right),$$

wherein, (u, v) are coordinates in the plane coordinate system of a point in the shape-transformed image to be pasted; (λ,ϕ) are coordinates of the point with coordinates of (u, v) that are mapped into the spherical coordinate system;

$$r = \frac{n}{2\pi},$$

r is radius of the spherical projection image, and n is width of the first spherical panoramic image.

8. The device according to claim 5, wherein, the third transforming module is specifically used for:

transforming the image to be pasted that is rotated to the position, at which the first image pasting area overlaps with the image, into the second spherical panoramic image according to the following formula:

$$(\lambda', \phi') \to (x, y) = \left((m-1) - \left(\frac{\phi' + \frac{\pi}{2}}{\pi}\right)(m-1), \left(\frac{\lambda' + \phi'}{2\pi}\right)(n-1)\right),$$

wherein, $(\lambda', \phi')$ are coordinates in the spherical coordinate system of a point in the image to be pasted that is rotated to the position, at which the first image pasting area overlaps with the image; $\lambda', \phi'$ are respectively a longitude and a latitude of a point in the image to be pasted that is rotated to the position, at which the first image pasting area overlaps with the image; (x,y) are coordinates of a point with coordinates of $(\lambda', \phi')$ that are mapped into the plane coordinate system; m and n are respectively height and width of the first spherical panoramic image.

* * * * *

UNITED STATES PATENT AND TRADEMARK OFFICE
CERTIFICATE OF CORRECTION

PATENT NO. : 10,789,672 B2
APPLICATION NO. : 16/312564
DATED : September 29, 2020
INVENTOR(S) : Jiadan Zhu Page 1 of 1

It is certified that error appears in the above-identified patent and that said Letters Patent is hereby corrected as shown below:

In the Specification

In Column 10, Lines 41-42, after "formula" insert -- $\begin{bmatrix} x'_i \\ y'_i \\ 1 \end{bmatrix} \sim H \begin{bmatrix} x_i \\ y_i \\ 1 \end{bmatrix}$ --.

Signed and Sealed this
Sixteenth Day of February, 2021

Drew Hirshfeld
*Performing the Functions and Duties of the*
*Under Secretary of Commerce for Intellectual Property and*
*Director of the United States Patent and Trademark Office*